United States Patent [19]
Hughes et al.

[11] Patent Number: 5,892,908
[45] Date of Patent: Apr. 6, 1999

[54] METHOD OF EXTRACTING NETWORK INFORMATION

[75] Inventors: Jeffrey Alan Hughes; Lai-chong May Chan; Richard Stephen Elliott, all of Colorado Springs; Robert William Pinna, Manitou Springs, all of Colo.

[73] Assignee: MarketScape

[21] Appl. No.: 711,045

[22] Filed: Sep. 10, 1996

[51] Int. Cl.$^6$ .............................. G06F 3/00; H04L 12/00
[52] U.S. Cl. .................. 395/200.8; 395/200.53; 395/200.54; 395/200.55; 395/700
[58] Field of Search .............................. 395/200.39, 600, 395/200.53, 200.15, 619, 161, 200.8, 200.54, 200.55, 200.79, 700

[56] References Cited

U.S. PATENT DOCUMENTS

| | | | |
|---|---|---|---|
| 5,274,803 | 12/1993 | Dublin et al. | 395/600 |
| 5,295,244 | 3/1994 | Dev et al. | 395/161 |
| 5,544,314 | 8/1996 | Fuchsrieter et al. | 395/200 |
| 5,606,669 | 2/1997 | Bertin et al. | 395/200.15 |
| 5,721,919 | 2/1998 | Morel et al. | 395/619 |

*Primary Examiner*—Ellis A. Ramirez
*Assistant Examiner*—Ivan C. Pierce, IV
*Attorney, Agent, or Firm*—Dale B. Halling

[57] ABSTRACT

A method of extracting network information first receives an initial link address (102) and retrieves a file (104) associated with the initial link address. The file is then parsed (106) to find a hyper text link. Next it is determined (108) if the hyper text link has a link address that contains the network address as a root. When the link address contains the initial link address as the root, a link file associated with the link address is retrieved (110).

20 Claims, 10 Drawing Sheets

URL Format Examples

```
<HTML>
<HEAD><TITLE>Harvard University WWW Home Page</TITLE></HEAD>
<BODY BGCOLOR=FFFFFF VLINK=0000EE LINK=0000EE>
<P ALIGN=CENTER>
<IMG SRC="/home/banner.gif" ALT="Harvard University">
</P>
                114         116

<P ALIGN=CENTER> <IMG SRC="/home/crimson_line.gif"
ALT="_____">
<P>

<P>
<IMG ALIGN=LEFT SRC="/home/satveritas.gif" ALT="*"><H3>About Harvard
University</H3>
                    107
<UL>
   <L1><STRONG><A HREF="http://www.harvard.edu/home/help.html#Introduction to
Harvard">Introduction to Harvard</A></STRONG>
             100  108                                          102
   <L1><STRONG><A
HREF="http://netope.harvard.edu:80/hunews/hno.main.html">Harvard News and
Public Affairs</STRONG></A>
                   110                                                   109
   <L1><STRONG><A HREF="gopher://gopher.harvard.edu:70/hh/.vine/topics/telephone/">Directories of
Telephone and email Addresses</A></STRONG>
              112
   <L1><STRONG><A HREF="http://www.fas.harvard.edu/map">Map of Harvard</A></STRONG>Link
o FAS Computer Services
   </UL>
<P>          106

<IMG ALIGN=LEFT
SRC="/home/satveritas.gif" ALT="*"><H3>Harvard Electronic Resources</H3>
<UL>

<L1><STRONG><A
HREF="http://www.harvard.edu/presidents_office/commencement_96/"
     >1996 Commencement Speeches</A> delivered by President Neil Rudenstine<BR>
and Harold Varmus, NIH</STRONG>

<P>

<L1><A HREF="http://www.harvnet.harvard.edu/"><STRONG>Harvard
Conference on the Internet and Society</STRONG></A><BR>
Held May 28-31, 1996, the current pages host the "Virtual Conference"
for participants to review Conference threads.

<P>

<L1><STRING><A HREF="/home/alphalist.html">Alphabetic
Listing</A></STRONG>University Gopher
      and Web Sites
```

FIG. 6

```
<HTML>
<HEAD>
<META NAME="Packager" Content="MarketScape WebCD Packager 1.0">
<TITLE>Harvard University WWW Home Page</TITLE></HEAD>
<BODY BGCOLOR=FFFFFF VLINK=0000EE LINK=0000EE>
<P ALIGN=CENTER>
<IMG SRC="/00006.gif" ALT="Harvard University">
</P>
<P ALIGN=CENTER> <IMG SRC="/00007.gif"
ALT="_____">
<P>

<P>
<IMG ALIGN=LEFT SRC="/00008.gif" ALT="*"><H3>About
Harvard University</H3>

<UL>
    <L1><STRONG><A HREF="http://www.harvard.edu/home/help.html#Introduction to
Harvard">Introduction to Harvard</A>,</STRONG>

<L1><STRONG><A
HREF="http://netope.harvard.edu:80/hunews/hno.main.html">Harvard News and
Public Affairs</STRONG></A>

<L1><STRONG><A HREF="gopher://gopher.harvard.edu:70/hh/.vine/topics/telephone/">Directories of
Telephone and email Addresses</A></STRONG>

<L1><STRONG><A HREF="http://www.fas.harvard.edu/map">Map of Harvard</A></STRONG> Link
to FAS Computer Services
    </UL>
<P>

<IMG ALIGN=LEFT
SRC="/home/satveritas.gif" ALT="*"><H3>Harvard Electronics Resources</H3>
<UL>

<L1><STRONG><A
HREF="http://www.harvard.edu/presidents_office/commencement_96/"
    >1996 Commencement Speeches</A> delivered by President Neil Rudenstine<BR>
and Harold Varmus, NIH</STRONG>

<P>

<L1><A HREF="http://www.harvnet.harvard.edu/"><STRONG>Harvard
Conference on the Internet and Society</STRONG></A><BR>
Held May 28-31, 1996, the current pages host the "Virtual Conference"
for participants to review Conference threads.

<P>

<L1><STRONG><A HREF="/home/alphalist.html">Alphabetic
Listing</A></STRONG> University Gopher
```

FIG. 7

METHOD OF EXTRACTING NETWORK INFORMATION

FIELD OF THE INVENTION

The present invention relates generally to computer networks and more particularly to a method of extracting network information.

BACKGROUND OF THE INVENTION

Networks have become an essential part of the corporate computing environment. The Internet is a world wide network that interconnects computer networks to one another. Recently, a new method of communication has become very popular on the Internet. This method involves client applications know as "Web Browsers" and server application known as "Web Servers". The collective set of all the Web Servers in the world forms the "World Wide Web". The World Wide Web is a client/server application. Web Servers and Web Browsers use a Hyper Text Transport Protocol (HTTP) to exchange information. The information is formatted in a Hyper Text Markup Language (HTML). HTML files and other network files are identified by their Universal Resource Locators (URL).

Companies use internal networks often modeled on the Internet and the World Wide Web protocols to form an intranet to share information internal to the company. In addition, companies spend large amounts of money to put information on the Internet for use by their customers and potential customers. Unfortunately, only those people who have a computer with Internet access can view this information. It would be helpful if this information could be bundled in other formats (e.g., CD-ROMs, Diskettes, e-mail messages) for distribution. In order to bundle this information, it is necessary to retrieve the information from the network in a systematic manner. None of the existing products are designed to retrieve information in a systematic manner for bundling and distribution in other formats.

Thus there exists a need for a method of extracting network content in a systematic manner.

SUMMARY OF THE INVENTION

A method of extracting network information that overcomes these and other problems first receives an initial link address and retrieves a file associated with the initial link address. The file is then parsed to find any link address contained inside the file. When a link address is found in the file, it is determined if this link address has the same "root" as the initial link address. If the link address found has the same "root" as the initial link address, the file associated with the link address is then retrieved. Retrieved files are then further processed so that the hypertext links they contain can be made to point to other local files, rather than to files of the Internet. Any image maps in the retrieved files are converted so they will execute locally. In this manner the invention creates a bundle of content that can be executed locally, without the need for Internet connectivity.

BRIEF DESCRIPTION OF THE DRAWINGS

FIG. 6 is an example of a portion of an HTML file used to create the home page of FIG. 5;

FIG. 7 is an example of a portion of an HTML file of FIG. 6 after being updated for local use;

DETAILED DESCRIPTION OF THE DRAWINGS

Figure 1:
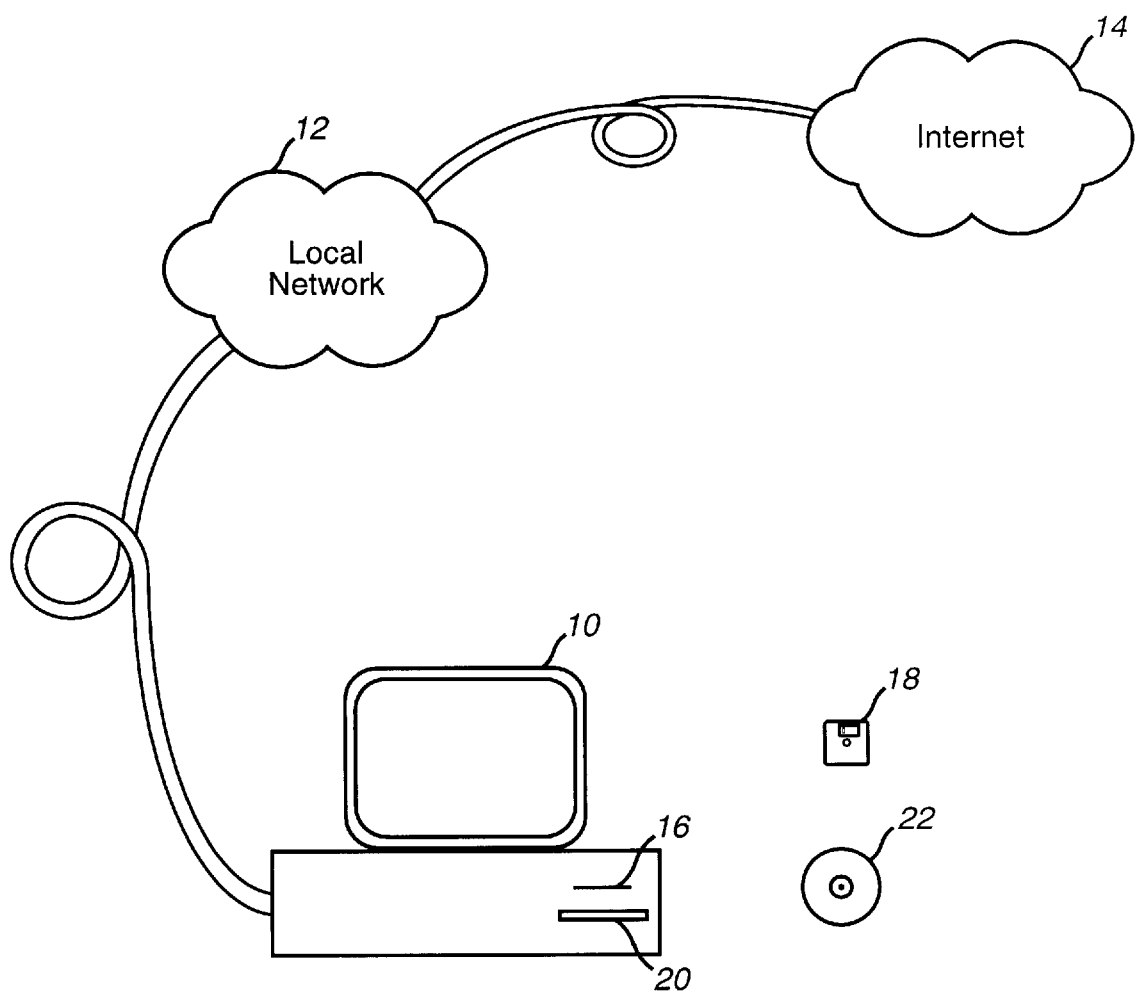
FIG. 1 is a block diagram of a computer connected to a network.

FIG. 1 is a block diagram of a computer 10 connected to a network. The computer can be connected to either a local network 12, the Internet 14 or to the Internet 14 through the local network 12. The computer has a computer disk reader 16 for reading (or writing to) a diskette 18 (computer-readable storage medium). The computer also has a Compact Disk-Recordable reader/writer 20 for reading a CD-ROM 22 or writing to a CD-Recordable 22. Both the diskette and the CD-ROM (i.e., computer-readable storage medium) can contain computer readable information, for executing the processes described herein.

Figure 2:
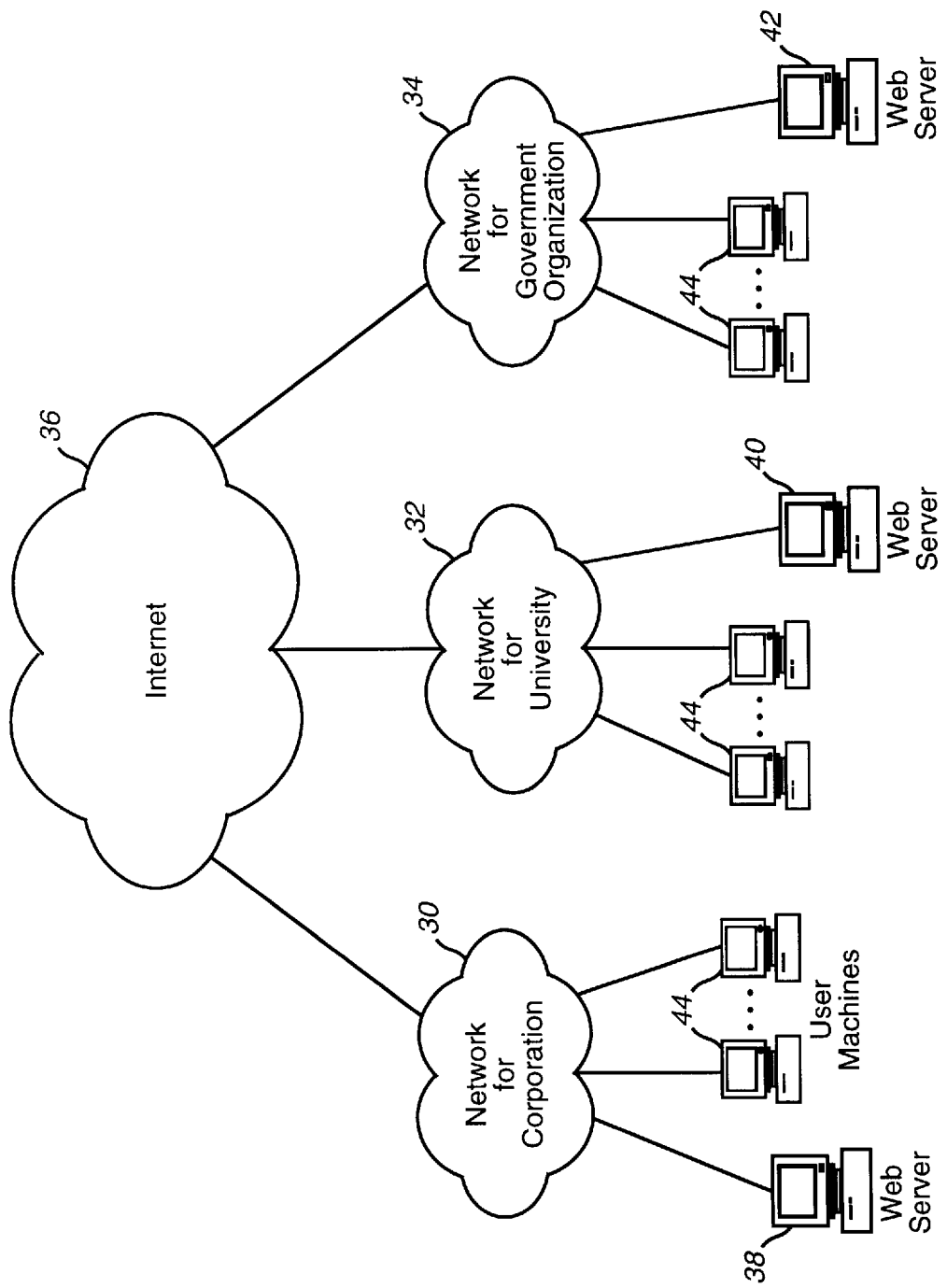
FIG. 2 is a schematic diagram of a World Wide Web.

FIG. 2 shows a plurality of networks 30, 32, 34 connected together through the Internet 36. Each of the plurality of networks 30–34 has a web server 38–42 connected to the Internet 36. A user machine 44 connected to one of the plurality of networks 30–36 can be used to access one of the web servers 38–42 through the Internet. The invention describes a systematic way of extracting information over the Internet 36 from one of the web servers 38–42, for bundling and distribution on a computer-readable storage medium. The invention uses a process that is executable by one of the user computers 44 to perform the extraction of the network information (network content) from one of the servers. This process can be contained in software (computer information) on a diskette, CD-ROM or other computer-readable storage medium.

Figure 3:
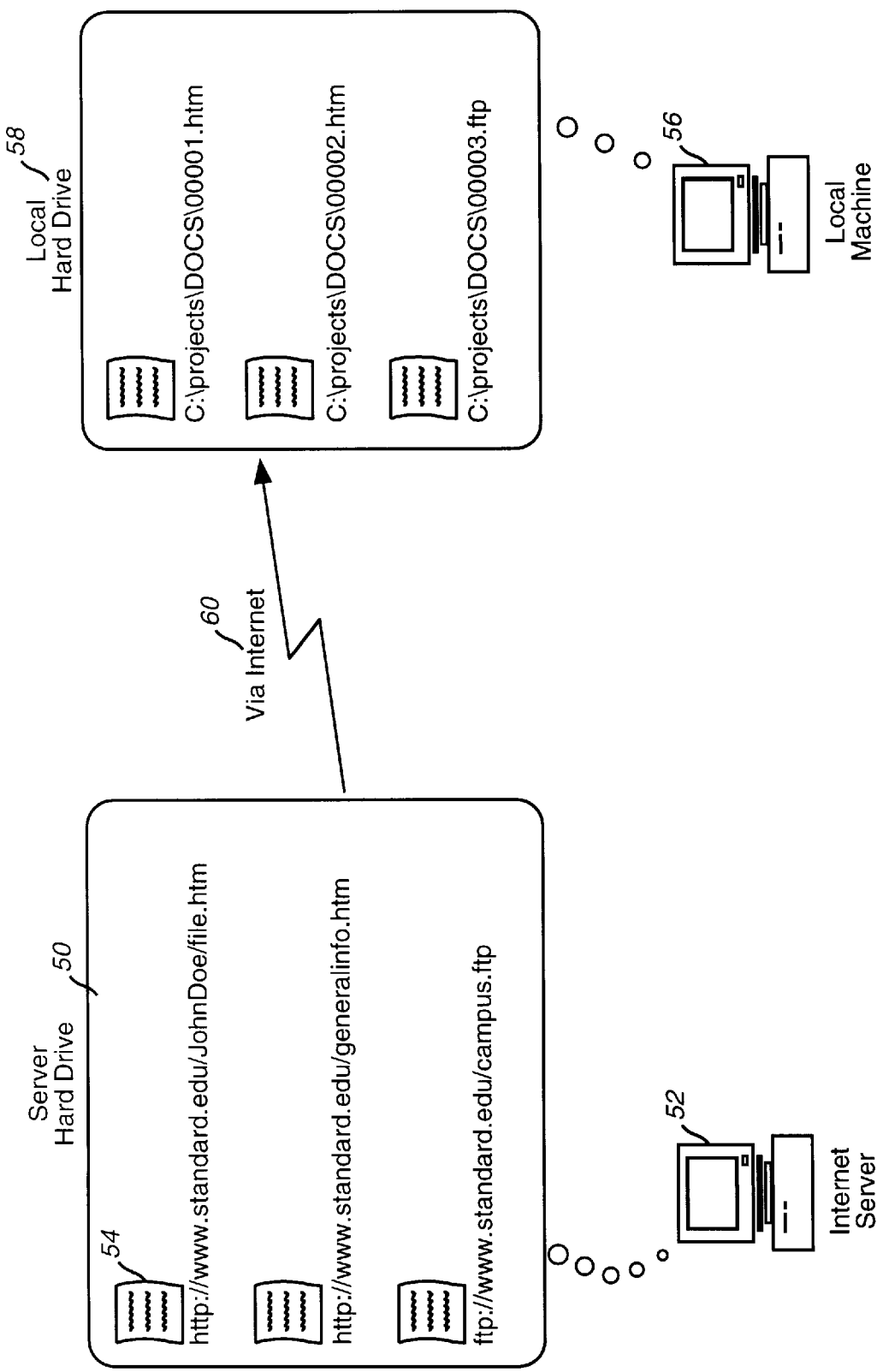
FIG. 3 is a schematic diagram of a process of extracting network information.

FIG. 3 is a schematic diagram of the process of extracting network information 50 from an Internet (World Wide Web) server 52. The network content 50 is stored on the hard drive of the Internet server 52 and consists of a plurality of files. The files can be in a number of formats including, but not limited to, Hyper Text Markup Language (HTML), Image files (e.g., GIF & JPEG), video (MPEG, MOV, AVI), ASCII files and binary files. Every file on the Internet server is identified by a Universal Resource Locator (URL). For instance, the first file 54 has an URL of http://www.standard.edu/johndoe/file.htm. Normally, a user would type this URL into their web browser application, and the file would be displayed on the local computer (local machine) 56. The invention downloads the file using the appropriate transport protocol (e.g., HTTP, FTP). The file is renamed so it is stored on the hard drive 58 of the local machine. For instance, the file http://www.standard.edu/johndoe.file.htm is renamed C:\projects\DOCS\00001.htm. This allows the file to be executed by the local machine without being connected to the Internet 60.

However, many Internet files, specifically HTML files, contain hyper text links that allow the user to jump to another URL (file) on the world wide web. The hyper text link may represent an URL for a file on the same server as the original file or may point to a file on a server half way around the world. To make the original file that was downloaded completely executable on the local machine it would be necessary to download every file pointed to in the original file. However, each of these files also contain hyper text links. As a result, it might be necessary to down load the better part of the Internet in order to make the original file downloaded completely executable.

This problem is solved by the invention by treating the Internet as if it were a file tree structured file system. The invention only downloads those files having the same "root address" as the original file. In another embodiment the invention only downloads the original file and none of the files associated with hyper text links. In another embodiment the invention downloads all the files associated with the hyper text links from the same server.

Figure 4:
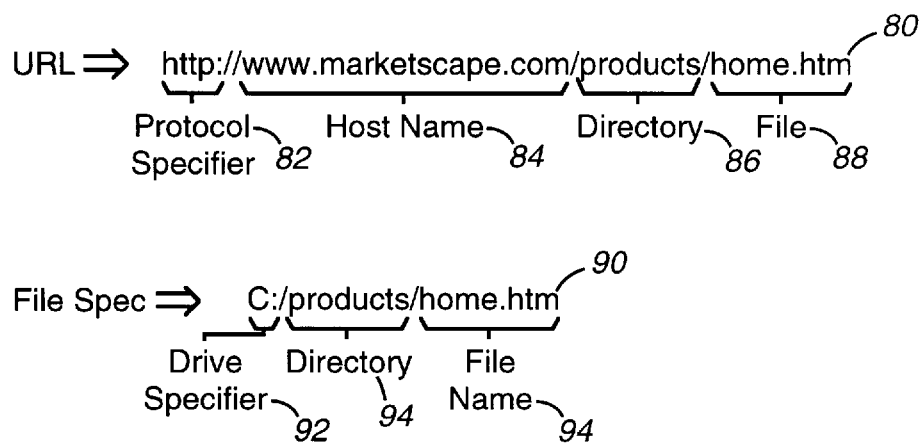
FIG. 4 is an example of an URL format on the web and a filename on a local file system.

FIG. 4 shows an URL (link address) 80 and its structure. The URL 80 starts with a protocol specifier 82, then a host name 84, a directory 86 and file name 88. If the URL 80 is the URL selected by the user, then the invention would download any link files with the format http://www.marketscape.com/products/*.* (where *.* represents any file name and any file in a subdirectory). The structure of an URL is similar to that used for DOS documents. The file specifier 90 shows how the URL 80 is similar to the file specifier 90. Note the file specifier 90 starts with a drive specifier 92, then the directory 94 and then the filename 96.

Figure 5:
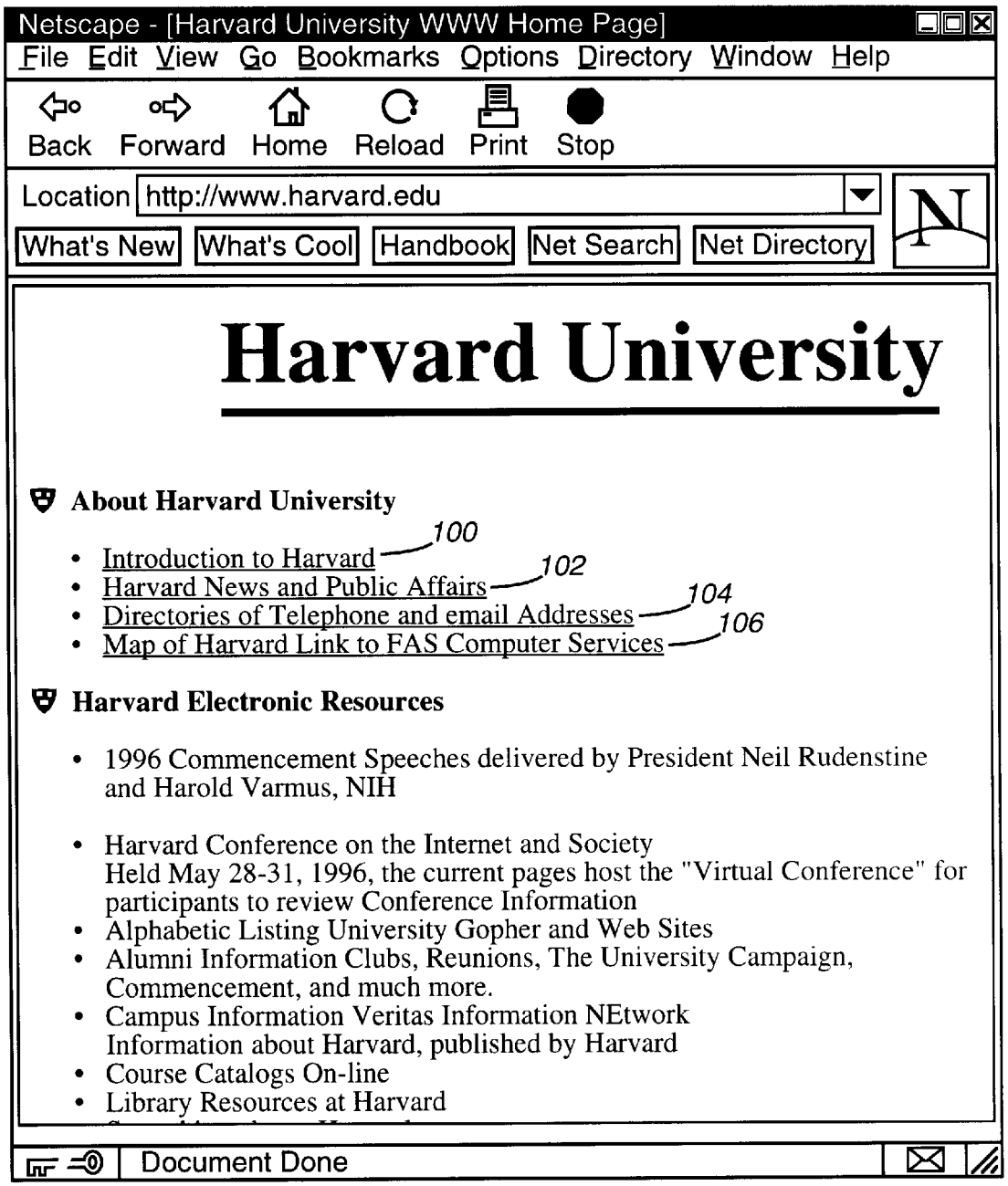
FIG. 5 is an example of a home page on the world wide web.

FIG. 5 shows the home page (network information) that an Internet user might access over the world wide web, having a URL of http://www.harvard.edu/248. When the user views this file using a World Wide Web Browser application the hyper text links are generally shown in a different color, blue for instance. Some of the hyper text links in the figure are "Introduction to Harvard" 100, "Harvard News and Public Affairs" 102, "Directories of Telephone and email Addresses" 104, and "Map of Harvard Link to FAS Computer Services" 106. When the user clicks his mouse on one of the hyper text links 100–106, the Browser application extracts the URL hidden behind the hypertext link, then retrieves and displays information from the network file pointed to by the URL. Assuming the user were to choose the URL http://www.harvard.edu/ as the initial URL to be processed using the invention, the computer would download the information in FIG. 5. This information would be stored on the hard disk of the user's computer. This file would appear as seen in FIG. 6 when viewed with an editor. Note only a portion of the file is shown. The hyper text links 100–106 have associated URLs 107–112. The URLs 107–112 include HTML files (hyper text files) and gopher files. Other files are also referenced in the home page file. Note the two image file URLs: "/home/banner.gif" 114; and "/home/crimson_line.gif" 116. Once the home page file shown in FIG. 6 is retrieved it is parsed to find the URLs (e.g., 107–116). After all the URLs are found and stored in the retrieval database, the files associated with URLs 107–112 need to be retrieved, and an appropriate local filename must be created be created for each. These local filenames are then stored in the database along with their associated URL. When the entire retrieval process is complete, a conversion process begins. All retrieved files must be modified so that the links they contain point to other local files, rather than to the original Internet file. When the conversion process encounters the file shown as FIG. 6, it will replace URLs 107–116 with appropriate filenames.

FIG. 7 shows the same file as in FIG. 6 after the URLs 107–116 have been converted to local file names 118–130. This allows the file to be run on the users local computer without having to access the Internet for most of the hyper text links.

Figure 8:
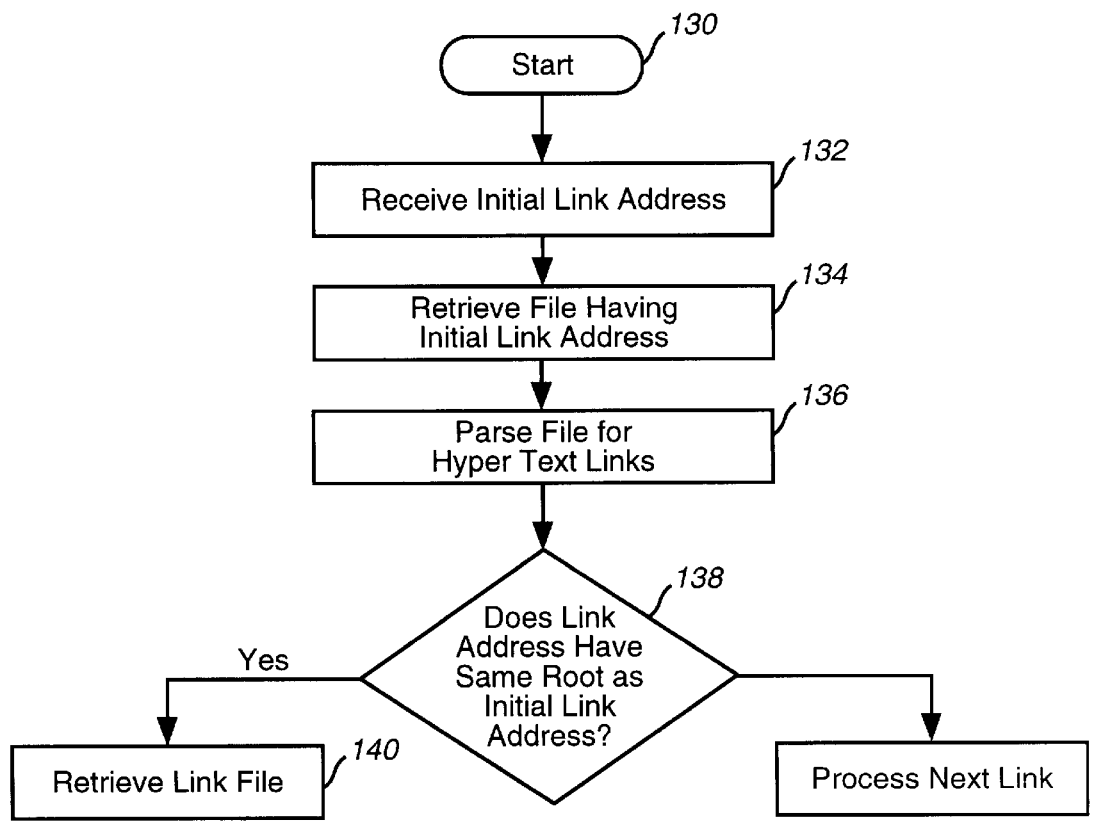
FIG. 8 is a flow chart of the process of extracting network information.

FIG. 8 is a flow chart of the process of extracting network information. The process starts, step 130, by receiving an initial link address (e.g, URL) at step 132. The process then retrieves a file having the initial link address at step 134. The file is then parsed for hyper text links (plurality of hyper text links) at step 136. At step 138 it is determined if a link address associated with the hyper text link has the same root (i.e., comes from the same directory) as the initial link address. When the link address does have the same root as the initial link address, retrieving the link file at step 140. When the link address does not have the same root as the initial link address, processing the next hyper text link.

Figure 9:
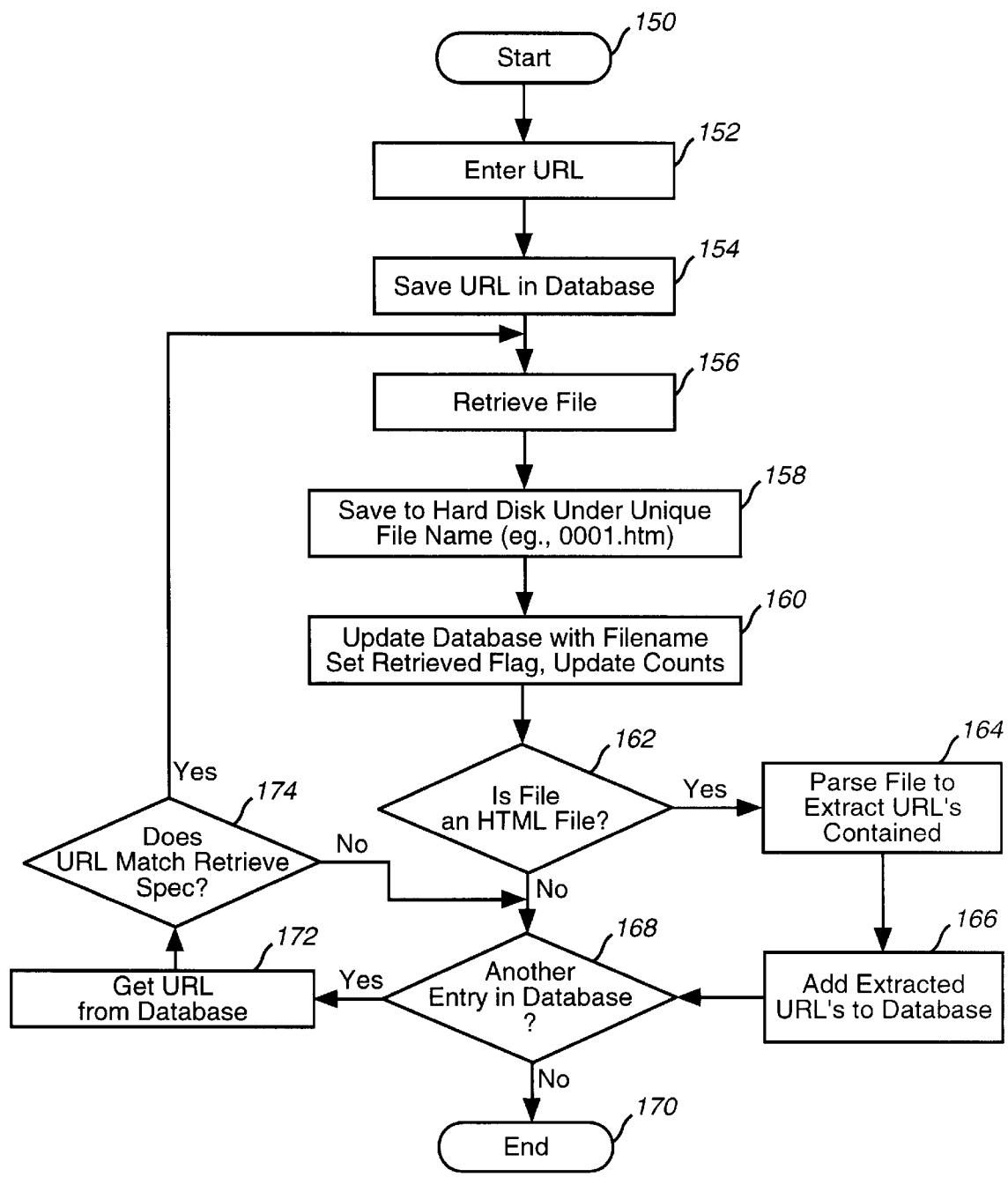
FIG. 9 is a flow chart of an alternative embodiment of the process of extracting network information.

FIG. 9 is a flow chart of an alternative embodiment of the process of extracting network information. The process starts, at step 150, with an URL being entered at step 152. The URL is saved to the retrieval database at step 154. Next, the file associated (unanalyzed file) with the URL is retrieved at step 156. The file is then saved to the local computer's hard drive under a unique file name (e.g., 0001.htm) at step 158. The database is then updated with the file name, a "retrieved" flag is set, and various counts and other information are saved at step 160. The counts include the number of HTML files downloaded, the number of FTP files downloaded, the number of URLs discovered and other information. At step 162 it is determined if the file is a HTML file (hyper text file). When the file is a HTML file, the file is parsed at step 164 to extract the URLs (plurality of new hyper text links) contained in the file. The extracted URLs are added to the retrieval database at step 166.

When the file is not a HTML file at step 162, it is determined if there is another entry in the retrieval database that has not been analyzed (unanalyzed link) at step 168. When there is not another entry in the retrieval database, ending at step 170. When there is another entry in the retrieval database, getting the URL for the entry at step 172. Next determining if the URL matches a retrieval specification at step 174. For instance, does the URL define a file from the same directory (i.e., common root) as the originally entered URL at step 152. When the URL does not meet the retrieval specification, returning to step 168. When the URL does meet the retrieval specification, returning to step 156. In this way the process analyzes every URL that was embedded in the file associated with original URL. The process retrieves all files associated with URLs that match the retrieval specification. And, it further analyzes all URLs in those retrieved files. The result is that all files for URLs matching the retrieval specification are retrieved. Files for URLs not matching the retrieval specification are "remembered" in the database, but they are not retrieved.

Once all the files have been downloaded from the Internet they still cannot be run from the hard drive of the local machine as a coherent set of local information. This is because the HTML files have hyper text links that still refer to files on the Internet. As a result it is necessary to convert most of the hyper text links so that they have a local relative address of a downloaded file. When a file associated with a hyper text link was not downloaded, the URL is not altered. In addition, all server-side image maps are converted to client-side image maps. A software process is used to convert the original server-side map file into a client-side HTML "chunk". This chunk replaces any previous reference to the corresponding server-side image map. The result of this process is that image maps can be executed locally on the users machine, without requiring Internet access.

Figure 10:
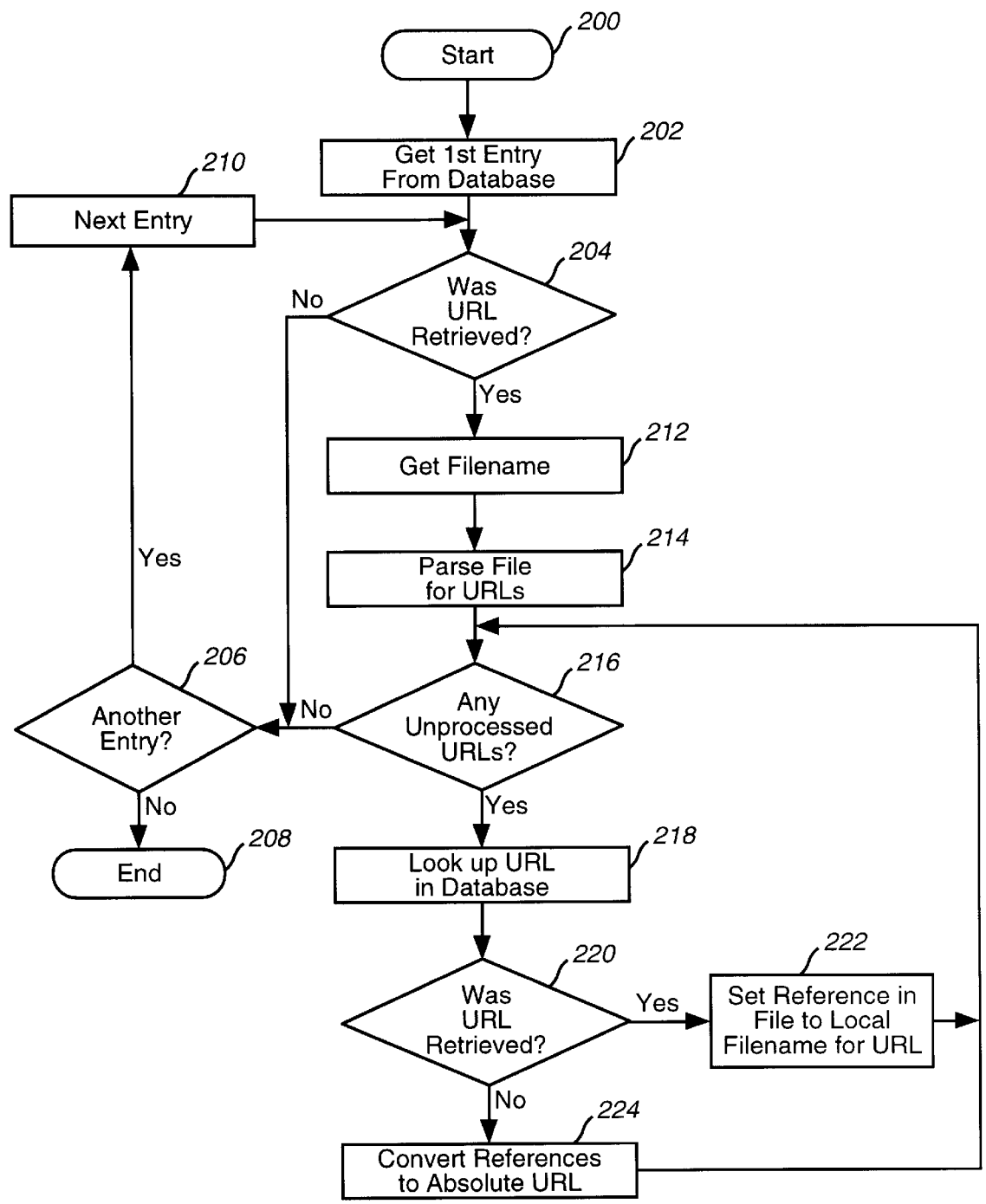
FIG. 10 is a flow chart of a process of adjusting the extracted network information for use on a local computer.

FIG. 10 is a flow chart of the process of "fixing the links", which is a part of extracting the information from the network. The process starts, step 200, by retrieving the first entry from the retrieval database at step 202. Next it is determined if the file associated with the URL of the first entry in the database was retrieved at step 204. When the file was not retrieved, the processing proceeds by determining if there is another entry at step 206. When there are no more entries the processing ends at step 208. When there is another entry, it is retrieved at step 210. Processing then returns to step 204.

When the file was retrieved at step 204, the local filename is read from the database at step 212. Next the file is parsed for URLs embedded in the file at step 214. At step 216 it is determined if there are any unprocessed URLs in the file. When all the URLs in the file have been processed, the process proceeds to step 206. When not all the URLs in the file have been processed, then the next URL in the file is processed starting at step 218 by looking up the URL in the retrieval database. At step 220 it is determined if the file associated with the URL was retrieved. When the file associated with the URL was retrieved, the reference is set in the file to the local filename for the URL at step 222. This means the hyper text link is no longer hides an URL for a file on the Internet but instead points to a file on the hard drive of the local computer. When the file associated with the URL was not retrieved, the reference in the file is converted to an absolute URL that points to the exact same network file at step 224. Processing then returns to step 216.

Thus using the invention described herein the user can systematically extract network content for bundling on another medium. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of extracting network information, comprising the steps of:
   (a) receiving an initial link address that points to a file;
   (b) retrieving the file associated with the initial link address;
   (c) parsing the file to find a hyper text link that points to a link file;
   (d) determining if the hyper text link has a link address that contains the initial link address as a root; and
   (e) when the link address contains the initial link address as the root, retrieving the link file associated with the link address.

2. The method of claim 1, further including the steps of:
   (f) when the link address does not contain the initial link address as the root, storing the link address in a discovery database.

3. The method of claims 1, wherein step (b) further includes storing the initial link address in a discovery database.

4. The method of claim 1, further including the steps of:
   (f) determining if the link file is a hyper text file;
   (g) when the link file is the hyper text file, parsing the link file to find a hyper text link.

5. The method of claim 4, further including the steps of:
   (h) when the link file is not the hyper text file, returning to step (c).

6. The method of claim 4, further including the step of:
   (h) storing the link address in a discovery database.

7. A method of extricating network information, comprising the steps of:
   (a) receiving an initial link address point to a file;
   (b) copying the file associated with the initial link address;
   (c) scanning the file for a plurality of hyper text links; and
   (d) storing a link address, that points to a link file, for each of the plurality of hyper text links, in a discovery database.

8. The method of claim 7, wherein step (a) further includes the step of storing the initial link address in the discovery database.

9. The method of claim 7, further including the step of:
   (e) storing a file parameter associated with each of the plurality of hyper text links in the discovery database.

10. The method of claim 7, further including the steps of:
    (e) selecting an unanalyzed hyper text link from the discovery database;
    (f) determining if a link address associated with the unanalyzed hyper text link has a common root with the initial link address;
    (g) when the link address does not have the common root with the initial link address, returning to step (e).

11. The method of claim 10, further including the steps of:
    (h) when the link address does have the common root with the initial link address, determining if the unanalyzed hyper text link is a hyper link file;
    (i) when the unanalyzed hyper text link is not the hyper link file, returning to step (e).

12. The method of claim 11, further including the steps of:
    (j) when the unanalyzed hyper text link is the hyper link file, copying an unanalyzed link file associated with the link address;
    (k) searching the unanalyzed link file for a plurality of new hyper text links;
    (l) adding the plurality of new hyper text links to the discovery database.

13. The method of claim 7, further including the steps of:
    (e) converting a server side image map in the file to a client side image map;
    (f) converting a link address associated with each of the plurality of hyper text links to a local relative address.

14. The method of claim 7, further including the steps of:
    (e) selecting an unanalyzed hyper text link from the discovery database;
    (f) determining if the unanalyzed hyper text link is a hyper link file;
    (g) when the unanalyzed hyper text link is not the hyper link file, returning to step (e).

15. The method of claim 14, further including the steps of:
    (h) when the unanalyzed hyper text link is the hyper link file, determining if a link address associated with the unanalyzed hyper text link has a common root with the initial link address;
    (i) when the link address does not have the common root with the initial link address, returning to step (e).

16. The method of claim 15, further including the steps of:
    (j) when the link address does have the common root with the initial link address, copying an unanalyzed file associated with the link address;
    (k) scanning the unanalyzed file for a plurality of new hyper text links;
    (l) adding the plurality of new hyper text links to the discovery database.

17. A computer-readable storage medium containing computer-readable information that when executed by a computer connected to a network performs the following steps:

(a) receiving an initial link address that points to a file;

(b) locating the file on the network associated with the initial link address;

(c) downloading the file from the network to the computer;

(d) parsing the file to locate a plurality of hyper text; and (e) writing a plurality of link addresses associated with the plurality of hyper text links to a discovery database, each of the plurality of link addresses pointing to a link file.

18. The computer-readable storage medium of claim 17, further performing the steps of:

(f) determining for each of the plurality of link addresses in the discovery database if they have a common root with the initial link address;

(g) when one of the plurality of link addresses does have the common root, retrieving an associated file.

19. The computer-readable storage medium of claim 18, further performing the steps of:

(h) parsing the associated file to locate a plurality of new hyper text links.

(i) writing a new link address for each of the plurality of new hyper text links to the discovery database;

(j) returning to step (e).

20. The computer-readable storage medium of claim 19, wherein step (i) further includes the step of:

(ii) writing a local relative address, for each new link address, to the discovery database.

* * * * *